June 2, 1959 — R. S. COFFMAN — 2,889,071
SAFETY PRESSURE RELIEF DEVICE
Filed Oct. 3, 1955

ROBERT S. COFFMAN
INVENTOR.
BY

United States Patent Office 2,889,071
Patented June 2, 1959

2,889,071

SAFETY PRESSURE RELIEF DEVICE

Robert S. Coffman, Kansas City, Mo., assignor to Black, Sivalls & Bryson, Inc., Kansas City, Mo., a corporation of Delaware Application October 3, 1955, Serial No. 538,054

2 Claims. (Cl. 220—89)

The present invention relates generally to devices in the form of safety pressure relief devices for the protection of pressure equipment and particularly to safety pressure relief devices of extremely large diameter.

Normally safety pressure relief devices of the type which utilize the rupturing of a rupture member for the relieving of abnormal pressures in pressure equipment are made from a single sheet of material. Single sheets of sufficient thinness and of metallurgically controlled properties are generally not available in widths of more than twenty-four inches. Therefore, in installations which require a relieving area larger than twenty-four inches in diameter it becomes necessary to construct the rupture member of a plurality of sheets to avoid having to use a plurality of small devices.

Thus, the principal object of the present invention is to provide a safety pressure relief device composed of a plurality of members which will rupture within the same allowable variance from the predetermined bursting pressure as a device having a single rupture member.

A further object of the present invention is to provide a safety pressure relief device composed of a plurality of members which will rupture first at the central portion.

Further objects of the present invention are to provide a safety pressure relief device composed of a plurality of members wherein said members are overlapped to limit growth of crown height of the device prior to rupture; to provide a safety pressure relief device of a diameter larger than is practical for a single rupture member device; and to provide a safety pressure relief device composed of a plurality of members wherein the joint structure between adjacent members provides a stiffening design to hold the rupture device against a support member under most conditions of service prior to rupture.

In accomplishing these and other objects of the present invention I have provided improved details of structure, the preferred form of which is illustrated in the accompanying drawing wherein.

Figure 1:
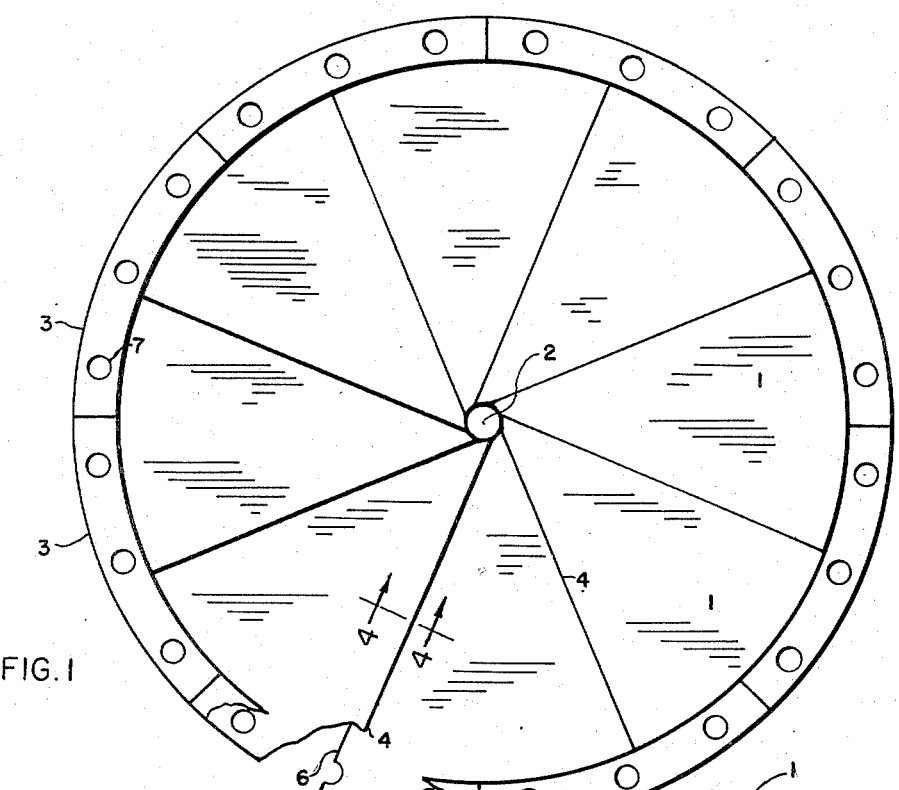
Fig. 1 is a plan view of the rupture member of the present invention with portions being broken away to clarify the joint structure between the segments.

Referring more in detail to the drawing:

The device shown in Fig. 1 is a rupture member composed of a plurality of individual segments 1, central disc member 2 and flange members 3. Segment 1 is substantially pie-shaped as shown in Fig. 1 and has a lapping portion 4 extending along one side from the outer periphery of segment 1 and terminating just short of the center corner 5 of the segment 1. All lapping portions 4 are extensions of the same relative edge of each segment 1, thereby causing the other radial edge 6 of segment 1 to be overlapped by the portion thus forming a complete circular structure.

The lapping portions 4 are spot welded or otherwise suitably secured to the lapped portion of sement 1 and silver soldered or otherwise suitably sealed along the entire joint both above and below. Flange members 3 are secured to the outer peripheral portion of the structure formed by segments 1 and have holes 7 therein extending through segment 1 to provide adequate fastening of the device into position in a relief area.

Figure 2:
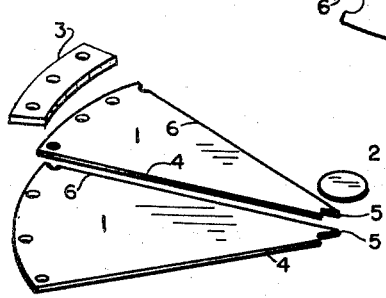
Fig. 2 is a perspective view of a set of parts of the device shown in disassembled spaced relation.

The space relationship of segments 1, central disc member 2 and flange members 3 is shown in Fig. 2 as an exploded perspective view of a portion of the parts of the device. It may be seen that lapping portion 4 of segment 1 lies above edge 6 of segment 1 and flange members 3 and central disc member 2 are positioned above segments 1 in overlapping relationship.

Figure 3:
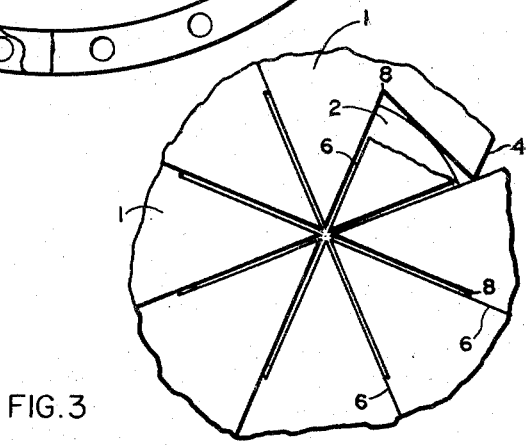
Fig. 3 is a detail view of the underside of the central portion of the device shown in Fig. 1.

Fig. 3 illustrates the relative position of segments 1 and central disc 2. This center construction is designed to provide a strengthened joint, thereby assuring that the rupture of the panel will occur across the center section, along the edge 6 and into the segment at a point near one of the several notches 8. This type of rupture will assure a control of the rupture so that the portion which will fail will be known in advance and can be designed as to thickness and strength to provide a predetermined rupture pressure for the unit.

Figure 4:
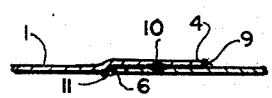
Fig. 4 is a sectional view of the joint between segments taken along line 4—4 in Fig. 1.

The sectional view shown in Fig. 4 merely illustrates the use of silver solder or other means as shown at 9 to effect sealing between lapping portions 4 and segments 1. The members are initially joined by spot welds as shown at 10. Edge portion 6 is also sealed to the underside of segment 1 by silver solder or other suitable means as shown at 11.

It should be obvious that while the drawings all show the device of the present invention in its flat form that it would operate satisfactorily under many conditions having a dome-shape common to many rupture type safety pressure relief devices. Also, it is obvious that a device fabricated from a plurality of members such as disclosed in the present invention would be equally adaptable to cover a relief area which is in the shape of a regular polygon rather than the circular shape illustrated in the drawings.

The device of the present invention, being a rupture member, should be supported on its pressure side by a supporting member unless it is to be placed in service under conditions where there is no possibility of having a pressure reversal. Support members have been found helpful in applications for the device of the present invention which are subject to vibration. The support member effects a dampening of the vibration tendency of the device. A support member of the type described in United States Letters Patent Number 2,523,068 issued September 19, 1950 to R. L. Simpson and Robert S. Coffman, the present inventor, is suitable for supporting the rupture device of the present invention and it may be fabricated with a flat peripheral flange to fit under segments 1.

Thus it may be seen that I have provided a device which will function when installed in position protecting a vessel against excessive pressures where the required relieving capacities are extremely large and the rupture pressure extremely low. In providing such a device the construction of the several members and their positioning with respect to one another is such that the rupture strength of the device may be easily predetermined and adjusted to suit the conditions under which it is to be used. Also, I have provided a safety pressure relief device which will rupture initially across the central portion by reason of the specific construction of the device which comprises: a plurality of sector-shaped elements, a central disc member, said elements and said disc member being joined to form a circular structure having radial lap joints between said elements providing increased strength along the joints and causing the device to rupture on radial lines of failure which do not pass through said radial lap joints, and means sealing the joints between said elements and said disc member.

What I claim and desire to secure by Letters Patent is:

1. A safety pressure relief device consisting of an annular flange member, a plurality of sector shaped frangible elements and a central frangible disc member, said sector elements when in assembled position providing a circular structure; one radial edge of each of said sector elements providing a lapping portion for the radial edge of an adjacent sector element, and each lapping portion being cut away at the end near the apex of the sector element a radial distance substantially equal to about the radius of said disc member whereby, when the sector elements are assembled in overlapped position to form a circular structure, the remaining uncut apex portions of the sector elements have their radial edges contiguous to each other; means securing the overlapping edges of the sector elements to form radial joints; means securing the disc member in overlapping relationship to the said uncut apex portions; the annular flange member being secured to the outer periphery of said sector elements to position said structure across a relief passageway, said structure being adapted—when exposed to a predetermined pressure at which pressure relief of said pressure relief passageway is desired—to rupture in the central portion thereof along the contiguous edges of the apex portions, and in the sector elements between the radial joints.

2. A device according to claim 1, wherein the lapping portion is displaced from the plane of its sector element a distance substantially equal to the thickness of said element.

References Cited in the file of this patent

UNITED STATES PATENTS

| | | |
|---|---|---|
| 1,748,222 | Haupt | Feb. 25, 1930 |
| 1,844,961 | Kramer | Feb. 16, 1932 |
| 1,907,268 | Schwemlein | May 2, 1933 |
| 2,523,068 | Simpson et al. | Sept. 19, 1950 |
| 2,766,707 | Foster et al. | Oct. 16, 1956 |